(12) United States Patent
Egawa et al.

(10) Patent No.: US 7,469,959 B2
(45) Date of Patent: Dec. 30, 2008

(54) REAR VEHICLE BODY STRUCTURE

(75) Inventors: Yasuhisa Egawa, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 11/561,080

(22) Filed: Nov. 17, 2006

(65) Prior Publication Data

US 2007/0114815 A1 May 24, 2007

(30) Foreign Application Priority Data

Nov. 21, 2005 (JP) ............................. 2005-335921

(51) Int. Cl.
*B62D 25/08* (2006.01)
*B60R 19/24* (2006.01)

(52) U.S. Cl. ............................. 296/203.04; 296/187.11; 296/187.1; 296/193.06; 293/154

(58) Field of Classification Search .............. 296/187.1, 296/187.11, 193.06, 203.04, 203.01, 193.08; 293/154, 155
See application file for complete search history.

(56) References Cited

U.S. PATENT DOCUMENTS

| 6,988,753 | B1 * | 1/2006 | Omura et al. | 293/13 |
| 7,032,961 | B2 * | 4/2006 | Matsuda | 296/204 |
| 7,210,719 | B2 * | 5/2007 | Honda et al. | 293/155 |
| 7,347,475 | B2 * | 3/2008 | Ikemoto et al. | 296/37.16 |

FOREIGN PATENT DOCUMENTS

JP 2004-338419 12/2004

\* cited by examiner

*Primary Examiner*—Dennis H Pedder
(74) *Attorney, Agent, or Firm*—Rankin, Hill & Clark LLP

(57) ABSTRACT

A rear vehicle body structure including a left-right pair of first rear frame, a second rear frame arcuate in plan view which is connected to the rear ends of the first rear frames, a rear bumper beam with a front surface of a central portion thereof connected to a rear surface of the second rear frame, a left-right pair of fender beams with one-side end portions thereof connected respectively to both end portions of the rear bumper beam, and a left-right pair of rearmost portion pillars connected to the other end portions of the fender frames.

2 Claims, 8 Drawing Sheets

REAR VEHICLE BODY STRUCTURE

BACKGROUND OF THE INVENTION

1. Field of the Invention

The present invention relates to a rear vehicle body structure capable of reducing the weight of a rear frame or frames.

2. Description of the Related Art

In a conventional rear vehicle body structure, in general, a rear bumper beam is fastened to a left-right pair of rear frames extending straight in the front-rear direction of the vehicle body. Specifically, as shown in FIG. 1, intermediate portions of the left-right pair of rear frames 2a and 2b are connected to each other through a rear cross member 4, and front end portions of the rear frames 2a and 2b are connected to each other through a middle cross member 6, thereby securing strength. The rear bumper beam 8 is connected to rear end portions of the rear frames 2a and 2b.

In the conventional rear vehicle body structure as shown in FIG. 1, the rear frames 2a and 2b extend straight in the front-rear direction of the vehicle body. Therefore, upon a rear surface offset collision as indicated by arrow F, about 70% of the load F of the offset collision is shared by the rear frame 2a, and about 30% is shared by the rear frame 2b on the non-collision side. In such a conventional rear vehicle body structure, therefore, a high load acts on the rear frame 2a on the collision side; in view of this, frame reinforcement is needed, with the result that the weight of the rear frames 2a and 2b is increased.

In Japanese patent laid-open number 2004-338419, a curved rear bumper beam is disclosed, but the left-right pair of rear frames are straight in shape in the front-rear direction. Therefore, upon a rear surface offset collision, the collision load is shared unevenly by the left and right rear frames, and, accordingly, the degree of reinforcement necessary for the rear frames is increased, and the weight of the rear frames is increased.

SUMMARY OF THE INVENTION

It is therefore an object of the present invention to provide a rear vehicle body structure capable of sharing the collision load upon a rear surface offset collision by left and right rear frames substantially evenly and capable of reducing the weight of rear frames.

In accordance with an aspect of the present invention, there is provided a rear vehicle body structure including: a left-right pair of first rear frames; a second rear frame arcuate in plan view which is connected to the rear ends of the first rear frames; a rear bumper beam with a front surface of a central portion thereof connected to a rear surface of the arcuate second rear frame; a left-right pair of fender frames with one-side end portions thereof connected respectively to both end portions of the rear bumper beam; and a left-right pair of rearmost portion pillars connected to the other-side end portions of the fender frames.

With the above configuration, the collision load upon a rear surface offset collision acts on the apex of the arcuate shape of the second rear frame, so that the load is dispersed to the left and right pair of first rear frames substantially easily. Therefore, the degree of reinforcement required for the rear frames can be reduced and, hence, the weight of the rear frames can be lessened.

Preferably, the arcuate second rear frame has a hat-like sectional shape with a top surface on the upper side, and a floor panel is welded to flange or brim-of-hat portions of the second rear frame.

Since the arcuate second rear frame has a hat-like sectional shape with the top surface on the upper side, and the floor panel is welded to flange (brim-of-hat) portions thereof, the space of a trunk room can be enlarged, and the performance of mounting a spare tire and the like is enhanced.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 2:
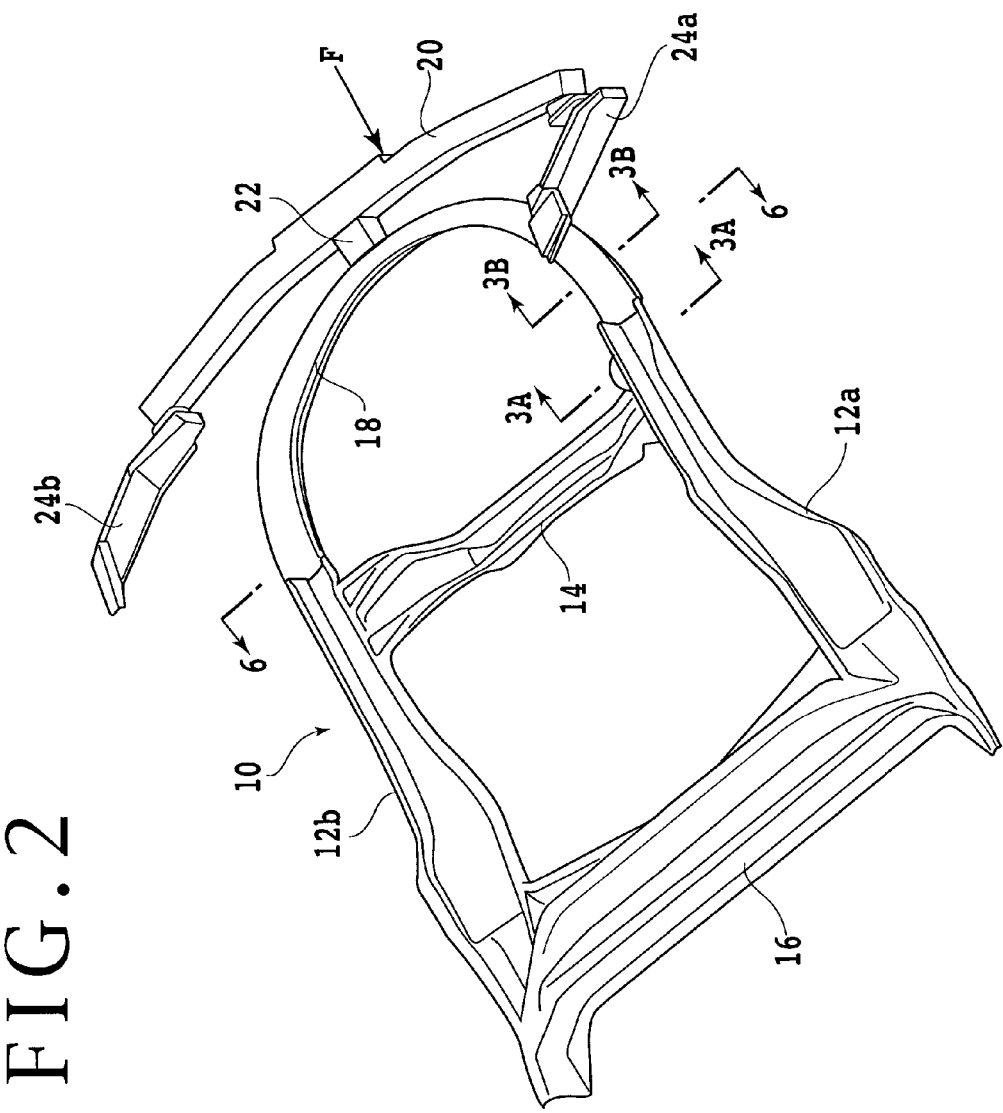
FIG. 2 is a schematic perspective view of a rear vehicle body structure according to an embodiment of the prevent invention.

Referring to FIG. 2, there is shown a perspective view of a rear vehicle body structure 10 according to an embodiment of the present invention. The rear vehicle body structure 10 includes a left-right pair of first rear frames 12a and 12b extending in the front-rear direction of the vehicle body, and the first rear frames 12a and 12b are connected to each other in the vicinity of their rear end portions through a rear cross member 14, and are connected to each other in the vicinity of their front end portions through a middle cross member 16, whereby the strength thereof as an assembly is secured.

An arcuate (semicircular) second rear frame 18 is connected to the rear ends of the first rear frames 12a and 12b. A central portion of a rear bumper beam 20 is connected, through a mounting bracket 22, to the apex of the arc of the arcuate second rear frame 18. Both ends of the rear bumper beam 20 are connected respectively to a left-right pair of fender frames 24a and 24b through mounting brackets 32 shown in FIG. 7. The fender frames 24a and 24b are connected to a left-right pair of C pillars (not shown).

Figure 3A:
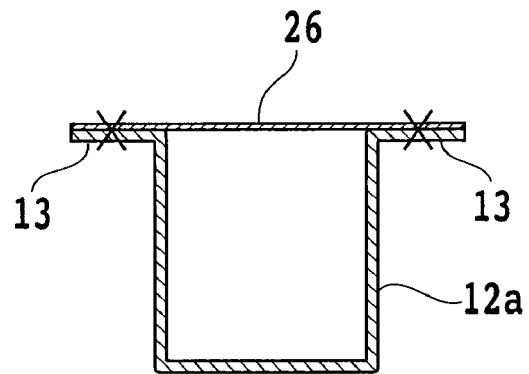
FIG. 3A is a sectional view along line 3A-3A of FIG. 2.
Figure 3B:
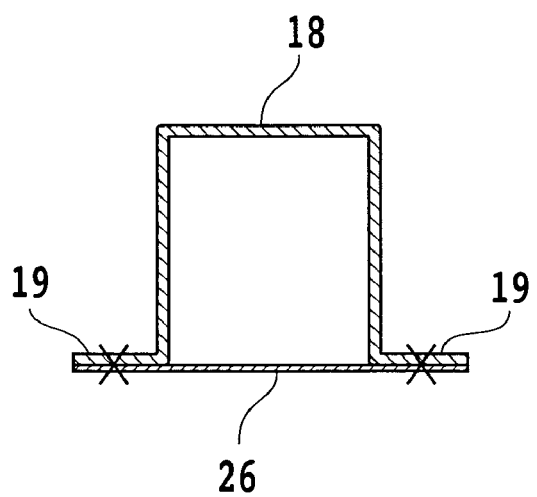
FIG. 3B is a sectional view along line 3B-3B of FIG. 2.

As shown in FIG. 3A, which is a sectional view along line 3A-3A of FIG. 2, the first rear frame 12a has a hat-like sectional shape with the top portion on the lower side, and a floor panel 26 is spot welded to flange portions 13 thereof. The first rear frame 12b has same shape as the first rear frame 12a and a floor panel 26 is spot welded to flange portions thereof. On the other hand, as shown in FIG. 3B, which is a sectional view along line 3B-3B of FIG. 2, the arcuate second rear frame 18 has a hat-like sectional shape with the top portion on the upper side, and a floor panel 26 is spot welded to the lower side of flange (brim-of-hat) portions 19 thereof.

Figure 4:
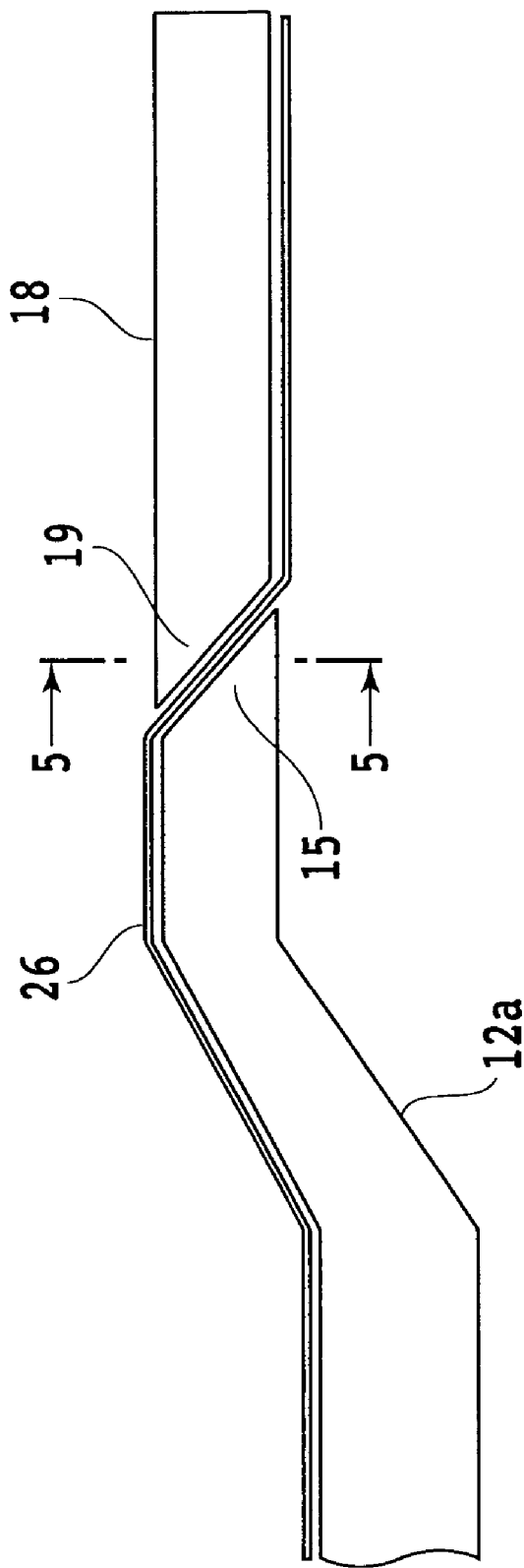
FIG. 4 is a side view of a connection portion between first and second rear frames.
Figure 5:
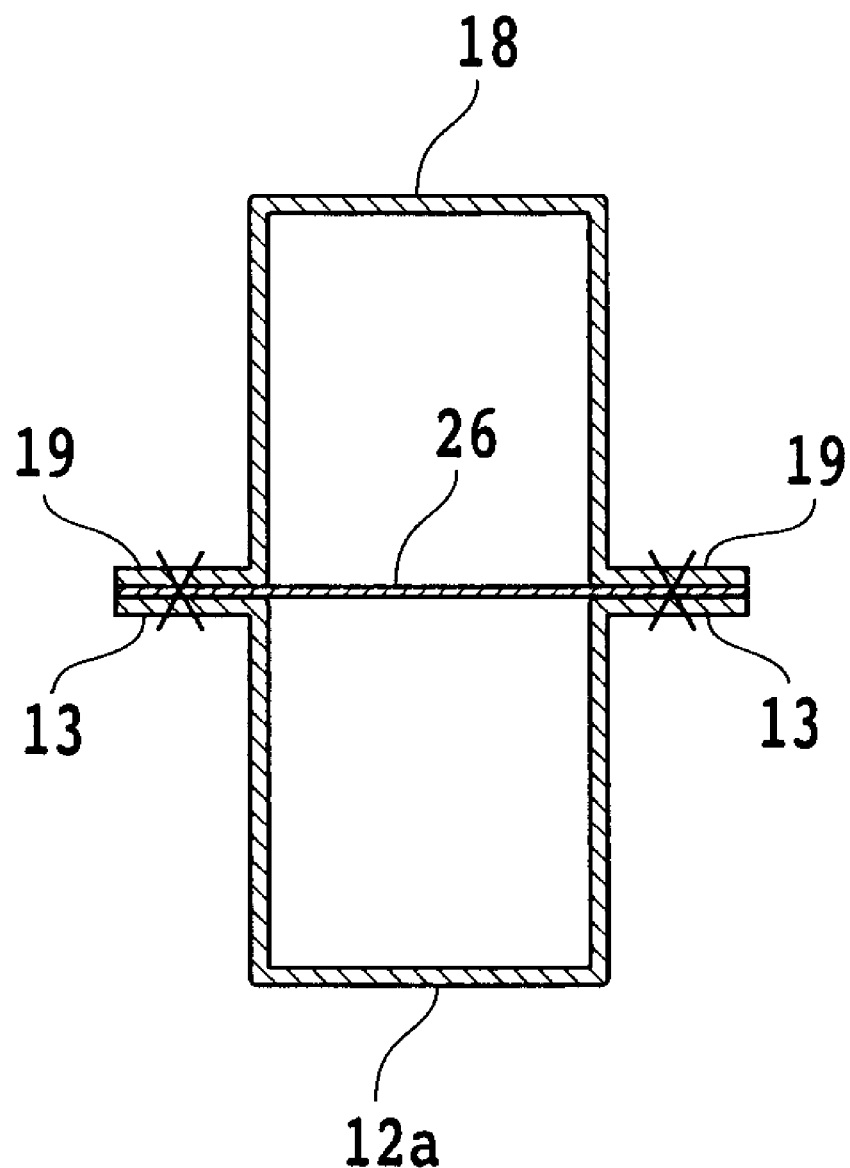
FIG. 5 is a sectional view along line 5-5 of FIG. 4.

FIG. 4 shows a side view of a connection portion between the first rear frame 12a and the second rear frame 18. The rear end of the first rear frame 12a is formed in a tapered shape 15, and the front end of the arcuate second rear frame 18 is formed in a tapered shape 19 complementary to the tapered shape 15. The floor panel 26 is spot welded to the upper side of the first rear frame 12a, extends as if it were sandwiched between the tapered rear end portion 15 of the first rear frame 12a and the tapered tip end portion 19 of the second rear frame 18 round to the lower side of the second rear frame 18, and is spot welded to the lower side of the second rear frame 18. FIG. 5 is a sectional view of a connection portion between the first rear frame 12a and the second rear frame 18.

Figure 6A:
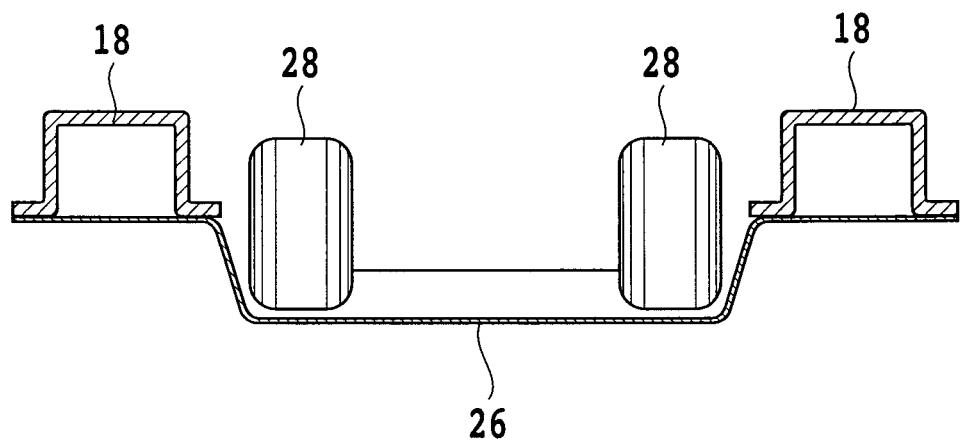
FIG. 6A is a sectional view along line 6-6 of FIG. 2.
Figure 6B:
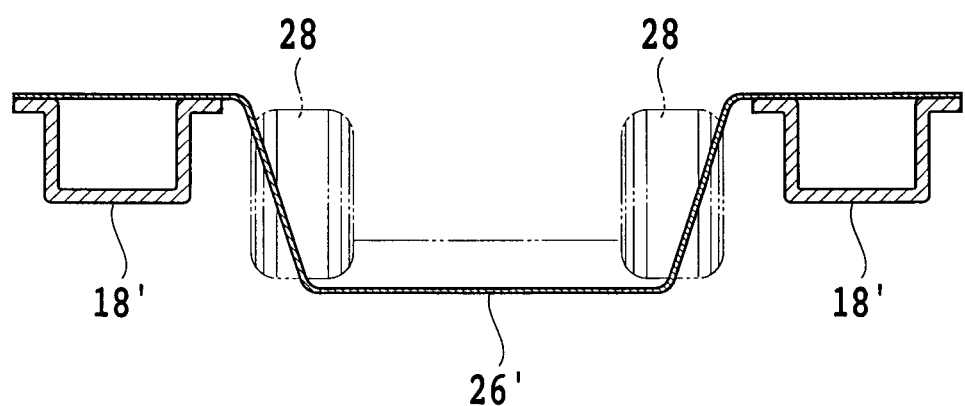
FIG. 6B is a sectional view of the same part in a comparative example.

The hat-like sectional shape of the first rear frames 12a, 12b and the hat-like sectional shape of the arcuate second rear frame 18 are in the upside-down relationship with each other. Therefore, as shown in FIG. 6A which is a sectional view along line 6-6 of FIG. 2, the space of a trunk room can be enlarged, and the performance of mounting a spare tire 28 and the like is enhanced. If the orientation of the hat-like sectional shape of the second rear frame 18' were the same as that of the first rear frames 12a and 12b as shown in FIG. 6B, the floor panel 26' would obstruct the mounting of the spare tire 28.

Figure 1:
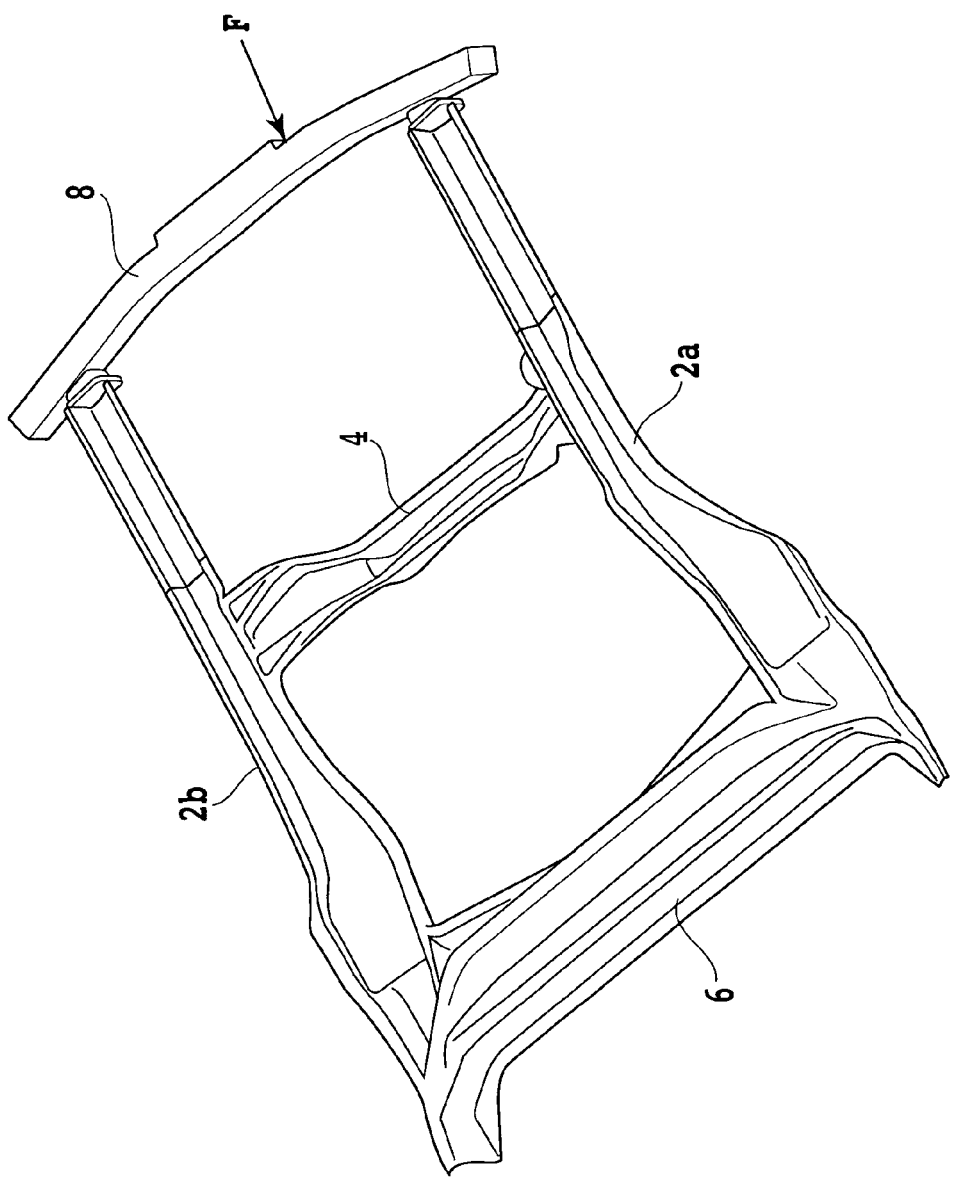
FIG. 1 is a schematic perspective view of a conventional rear vehicle body structure.

In the rear vehicle body structure 10 in this embodiment, when a load upon a rear surface offset collision acts on the rear bumper beam 20 as indicated by arrow F in FIG. 2, the collision load F is transmitted to the arcuate second rear frame 18 through the mounting bracket 22 provided at the center of the vehicle body; therefore, about 60% of the collision load is shared by the first rear frame 12a on the collision side, and about 40% of the load is shared by the first rear frame 12b on the non-collision side. Thus, the collision load upon a rear surface offset collision can be dispersed substantially evenly to the left and right first rear frames 12a, 12b. Therefore, as compared with the conventional rear vehicle body structure shown in FIG. 1, the rear vehicle body structure according to this embodiment can be reduced in weight by (70%−60%)/70%=about 15%.

Figure 7:
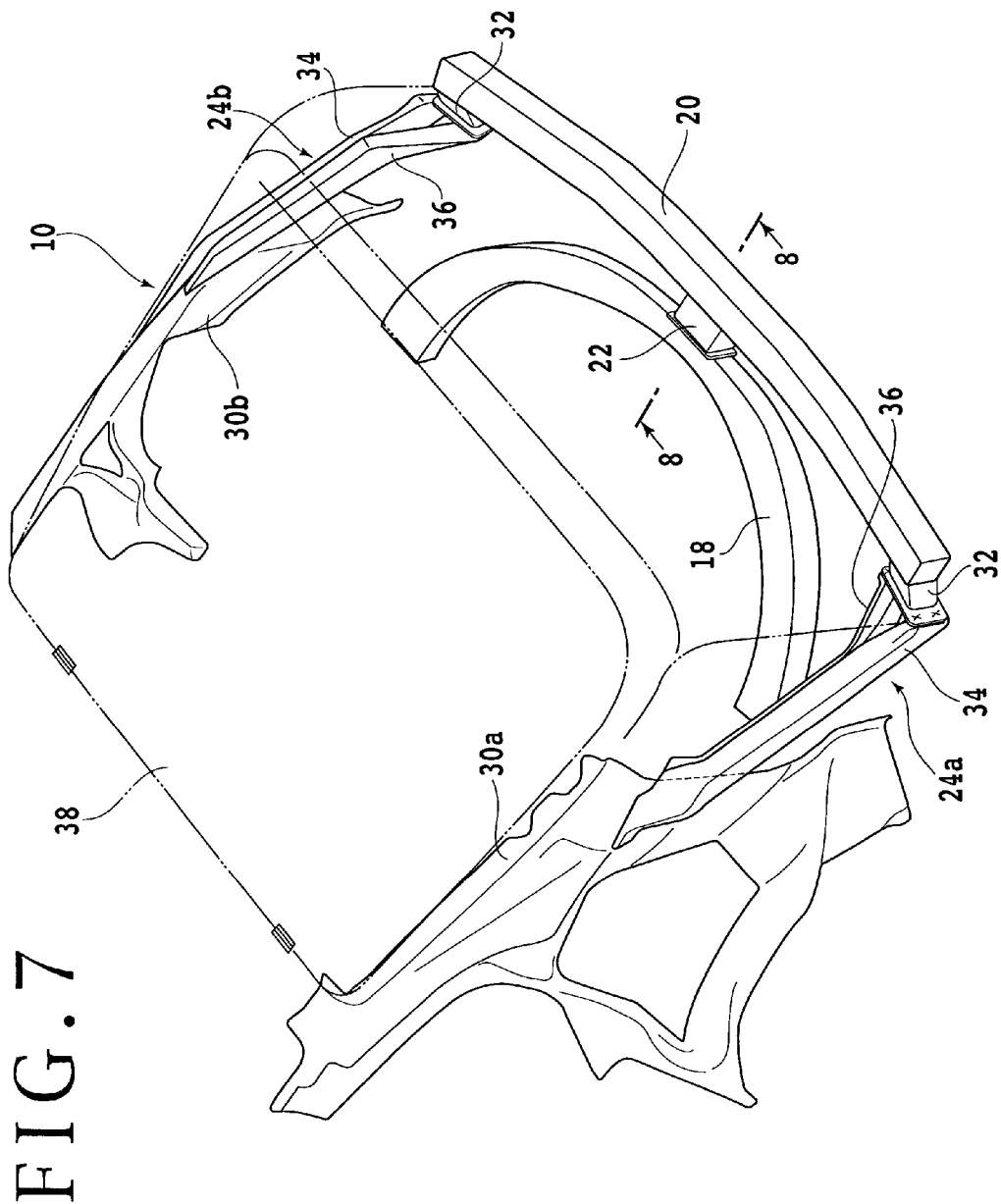
FIG. 7 is a perspective view showing a three-point mounting structure for a rear bumper beam with the first rear frame omitted.
Figure 8:
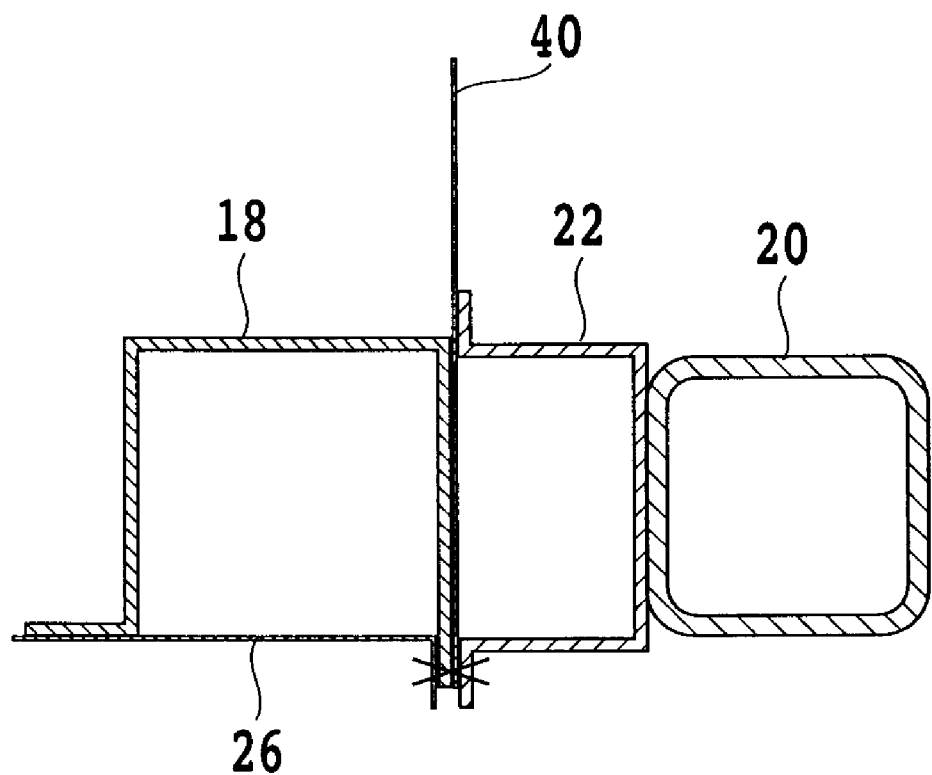
FIG. 8 is a sectional view along line 8-8 of FIG. 7.

Now, referring to FIG. 7, there is shown a perspective view of a three-point mounting structure for the rear bumper beam 20 in the rear vehicle body structure 10 in this embodiment. In FIG. 7, the first rear frames 12a and 12b are omitted. A central portion of the rear bumper beam 20 is connected to the apex of the arc of the arcuate second rear frame 18 through the mounting bracket 22, and both ends of the rear bumper beam 20 are connected to the left and right fender frames 24a and 24b through the mounting brackets 32. The connection portion between the rear bumper beam 20 and the second rear frame 18 is as shown in the sectional view of FIG. 8, and the mounting bracket 22 is spot welded to a rear panel 40 laid on the second rear frame 18.

In addition, the left and right fender frames 24a and 24b are each composed of an outer fender frame 34 and an inner fender frame 36, the rear ends of the outer fender frame 34 and the inner fender frame 36 are spot welded to the mounting bracket 32, and front end portions of the outer fender frames 34 and the inner fender frames 36 are spot welded to a left-right pair of rearmost portion pillars, for example, C pillar stiffeners (C pillars) 30a and 30b in the manner of sandwiching the C pillar stiffeners 30a and 30b. A rear tail gate 38 indicated by an imaginary line is mounted to the rear vehicle body structure 10 so that it can be opened and closed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A rear vehicle body structure comprising:
    a left-right pair of first rear frames;
    a second rear frame arcuate in plan view which is connected to the rear ends of said first rear frames;
    a rear bumper beam with a front surface of a central portion thereof connected to a rear surface of said arcuate second rear frame;
    a left-right pair of fender frames with one-side end portions thereof connected respectively to both end portions of said rear bumper beam; and
    a left-right pair of rearmost portion pillars connected to the other-side end portions of said fender frames.

2. The rear vehicle body structure as set forth in claim 1, wherein said arcuate second rear frame has a hat-like sectional shape with a top surface on the upper side, and a floor panel is welded to flange portions of said second rear frame.

* * * * *